US008525085B2

(12) United States Patent
Woskov et al.

(10) Patent No.: US 8,525,085 B2
(45) Date of Patent: Sep. 3, 2013

(54) DIRECTED ENERGY MELTER

(75) Inventors: Paul Woskov, Bedford, MA (US); S. Kamakshi Sundaram, Richland, WA (US); Daniel Cohn, Cambridge, MA (US); Jeffrey E. Surma, Richland, WA (US); David A. Lamar, West Richland, WA (US)

(73) Assignees: Massachusetts Institute of Technology, Cambridge, MA (US); Battelle Memorial Institute, Richland, WA (US); Inentec LLC, Bend, OR (US)

( * ) Notice: Subject to any disclaimer, the term of this patent is extended or adjusted under 35 U.S.C. 154(b) by 871 days.

(21) Appl. No.: 12/596,585

(22) PCT Filed: May 10, 2007

(86) PCT No.: PCT/US2007/068651
§ 371 (c)(1),
(2), (4) Date: Feb. 16, 2010

(87) PCT Pub. No.: WO2007/134159
PCT Pub. Date: Nov. 22, 2007

(65) Prior Publication Data
US 2011/0155720 A1     Jun. 30, 2011

Related U.S. Application Data

(60) Provisional application No. 60/746,927, filed on May 10, 2006.

(51) Int. Cl.
*H05B 6/72* (2006.01)
*C03B 5/02* (2006.01)

(52) U.S. Cl.
USPC .................. 219/601; 219/690; 65/135.6

(58) Field of Classification Search
USPC ....... 219/601, 690; 976/DIG. 277, DIG. 393; 588/19; 422/146; 65/135.6, 335, DIG. 4
See application file for complete search history.

(56) References Cited

U.S. PATENT DOCUMENTS

| 4,330,698 | A | * | 5/1982 | Sawada et al. | 219/696 |
| 5,319,172 | A | * | 6/1994 | Komatsu | 219/687 |
| 6,037,710 | A |  | 3/2000 | Poole et al. | |
| 6,074,623 | A |  | 6/2000 | Vick et al. | |
| 6,195,505 | B1 |  | 2/2001 | Van Alstyne | |
| 6,518,477 | B2 |  | 2/2003 | Soundararajan | |
| 6,919,847 | B2 |  | 7/2005 | Caplan et al. | |
| 6,941,878 | B2 |  | 9/2005 | Powell et al. | |

(Continued)

FOREIGN PATENT DOCUMENTS
WO     WO2005021450     *     3/2005

OTHER PUBLICATIONS

Abstract of WO2006/024379, Schmidt et al (Mar. 9, 2006) 1 page.*
PCT/US2007/68651, *International Search Report*, Apr. 24, 2008.

*Primary Examiner* — Caridad Everhart
(74) *Attorney, Agent, or Firm* — Choate, Hall & Stewart LLP; Charles E. Lyon; Daniel S. Matthews

(57) ABSTRACT

The melter includes a vessel and structure for introducing waste material into the vessel. Waveguide structure is provided for introducing millimeter wave electromagnetic radiation into the vessel to heat the waste material. A gyrotron is a preferred source for the millimeter wave electromagnetic radiation.

16 Claims, 3 Drawing Sheets

(56) References Cited

U.S. PATENT DOCUMENTS

| | | | |
|---|---|---|---|
| 7,022,198 B2 * | 4/2006 | Bruce et al. | 156/89.11 |
| 2005/0087529 A1 * | 4/2005 | Gallivan et al. | 219/748 |
| 2006/0144091 A1 * | 7/2006 | Kato et al. | 65/135.6 |
| 2008/0124253 A1 * | 5/2008 | Schmidt et al. | 422/146 |
| 2010/0209335 A1 * | 8/2010 | Mills | 423/648.1 |

* cited by examiner

DIRECTED ENERGY MELTER

This application claims priority to provisional application Ser. No. 60/746,927 filed May 10, 2006, the contents of which are incorporated herein by reference.

BACKGROUND OF THE INVENTION

This invention relates to a waste treatment system and more particularly to a system utilizing directed energy.

Glass melter technology has been used in waste treatment systems to put waste into a vitrified or glassified form that is highly stable and nonleachable. Such glass melter technology has played a crucial role in the treatment of radioactive waste. In the case of radioactive waste, by putting it into a vitrified form it may be safely isolated from the environment for very long periods of time. Radioactive waste that has been treated by glass melter technology includes material from the environmental clean up of Department of Energy facilities, and waste from nuclear power plants. Material from the dismantling of nuclear weapons can also be treated by glass melter technology. Present vitrification of radioactive waste is expensive, time consuming and very demanding in terms of safety requirements.

Present glass melter technology uses Joule (resistive) heating either from electrodes submerged in the waste material or by means of induced electrical currents. Conventional melters suffer shorter refractory life because of sidewall heating at the submerged electrodes. Electrodes also wear out and have to be replaced adding to the cost. A glass melter technology that does not require components to be submerged in the corrosive environment of the molten material will result in a cheaper, faster, more flexible and safer waste treatment system.

SUMMARY OF THE INVENTION

The directed energy melter of the invention for vitrification of waste material includes a vessel and structure for introducing waste material into the vessel. A waveguide structure introduces millimeter wave electromagnetic radiation into the vessel to heat the waste material. In a preferred embodiment the millimeter wave electromagnetic radiation is in the frequency range of 28 GHz- to 280 GHz. The waveguide may be corrugated.

In another preferred embodiment, a gyrotron located outside the vessel is provided to generate the millimeter wave electromagnetic radiation. The intensity of radiation impinging on the material is preferred to be in the range of 0.1 to 10 Kw/cm$^2$. It is also preferred that the angle of incidence of radiation on the waste material be in the range of 0 and 70°.

In yet another preferred embodiment, the structure for introducing waste material also introduces glass frit into the vessel. The intensity of the radiation is controlled using feedback from measurements of selected process parameters such as temperature. The melter of the invention may be operated in a batch or a continuous mode.

The melter according to the invention may include Joule heating, inductive heating or microwave heating in addition to the millimeter wave electromagnetic radiation.

The directed energy melter of the invention may be used for radioactive waste material, spent fuel rods, waste material from a reprocessing facility and/or waste material from a dismantled nuclear weapon.

In another preferred embodiment, a drain system is provided to convey molten material into storage containers. In yet another embodiment the vessel rotates and translates so that the material can be processed in a final container.

DESCRIPTION OF THE PREFERRED EMBODIMENT

The directed energy melter disclosed herein uses a beam of millimeter wave radiation to provide heating with a high degree of spatial and temporal control. A wide range of heating intensity (watts/cm$^2$) can be provided without temperature limits for improved glass compositions with more efficient storage capability. The millimeter wave radiation can be provided by gyrotron technology that is well established in the 28 to 170 GHz frequency range with high efficiencies. Gyroton frequencies up to 280 GHz may be used in the melter disclosed herein. Individual gyrotron devices have produced power levels of over 100 kilowatts in steady state operation. By using millimeter wave radiation rather than lower frequency sources in the microwave range (e.g., 2.45 GHz) it is possible to provide a spatially defined beam of radiation. Millimeter wave radiation also provides more penetration capability than higher frequency optical laser beams.

Figure 1:
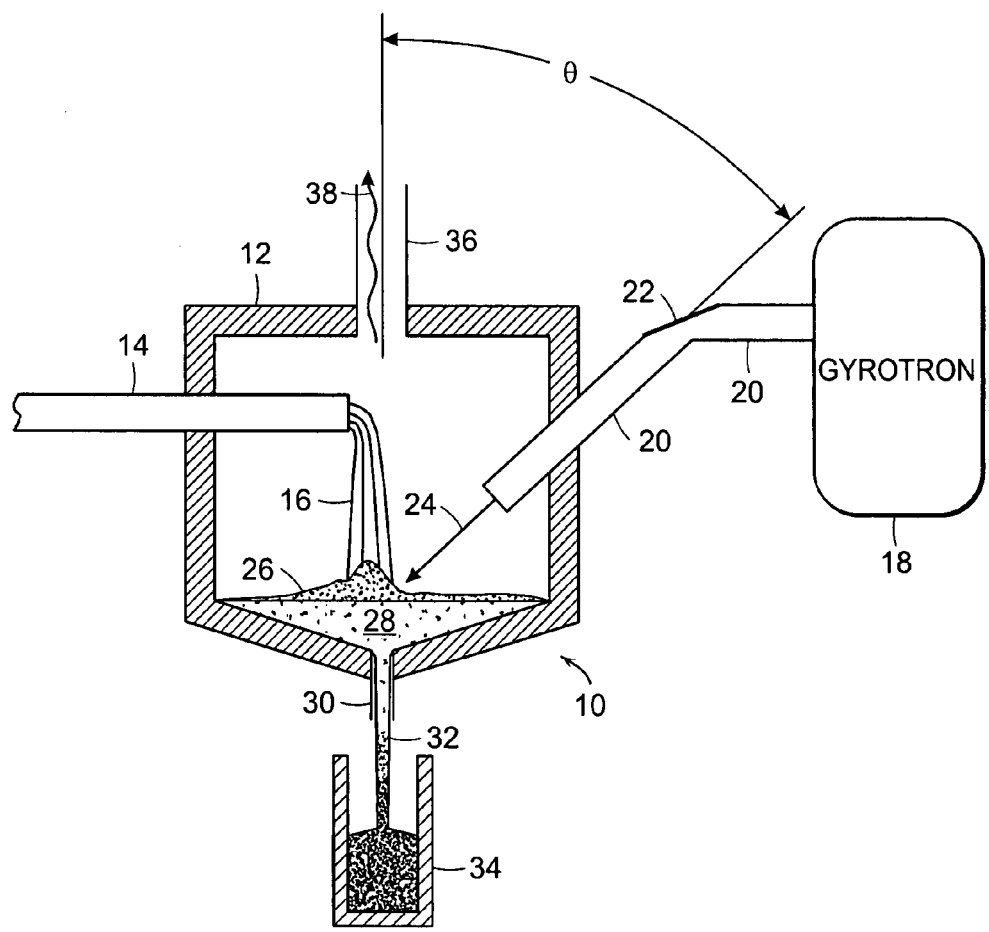
FIG. 1 is a cross-sectional view of an embodiment according to the invention.

With reference to FIG. 1, a directed energy melter system 10 of an embodiment of the invention includes a vessel 12 in which waste such as radioactive waste is vitrified. In this embodiment, a glass frit feed pipe 14 introduces glass frit 16 into the vessel 12.

A gyrotron 18 generates millimeter wave electromagnetic radiation in the frequency range 28 GHz up to approximately 280 GHz. The gyrotron 18 is coupled to a waveguide 20 that includes a mirror bend 22 for directing millimeter wave electromagnetic radiation 24 onto a premelt accumulation 26 on the surface of melt 28.

The waveguide 20 for conveying the directed energy beam 24 is typically a circular pipe having a diameter many wavelengths across and also having an inner wall surface for propagating the most efficient waveguide mode that is known to be an $HE_{11}$ mode. The waveguide 20 has a length and a mirror bend 22 as needed to connect the remotely located gyrotron 18 to the melter vessel 12. The angle Θ at which the energy beam 24 is directed at the heated surface is chosen to optimize energy absorption. It is known that for a given linear beam polarization that at a shallow angle of incidence can greatly minimize beam reflection from a dielectric surface. A suitable angle Θ is in the range of 0° to 70°.

The falling frit stream 16 and its accumulation on the melt surface 26 is partially traversed by the directed energy beam 24 for preheating. Main energy absorption occurs at the glass melt 28. A pour spout 30 directs the glass pour 32 into a final storage container 34. The molten glass pool 28 is shallow to keep the pour in close proximity to the location of heat absorption to maintain a fluid flow. A gas exhaust duct 36 provides an egress for volatization exhaust 38 that is not contained by a cold cap within the vessel 12.

Figure 2A:
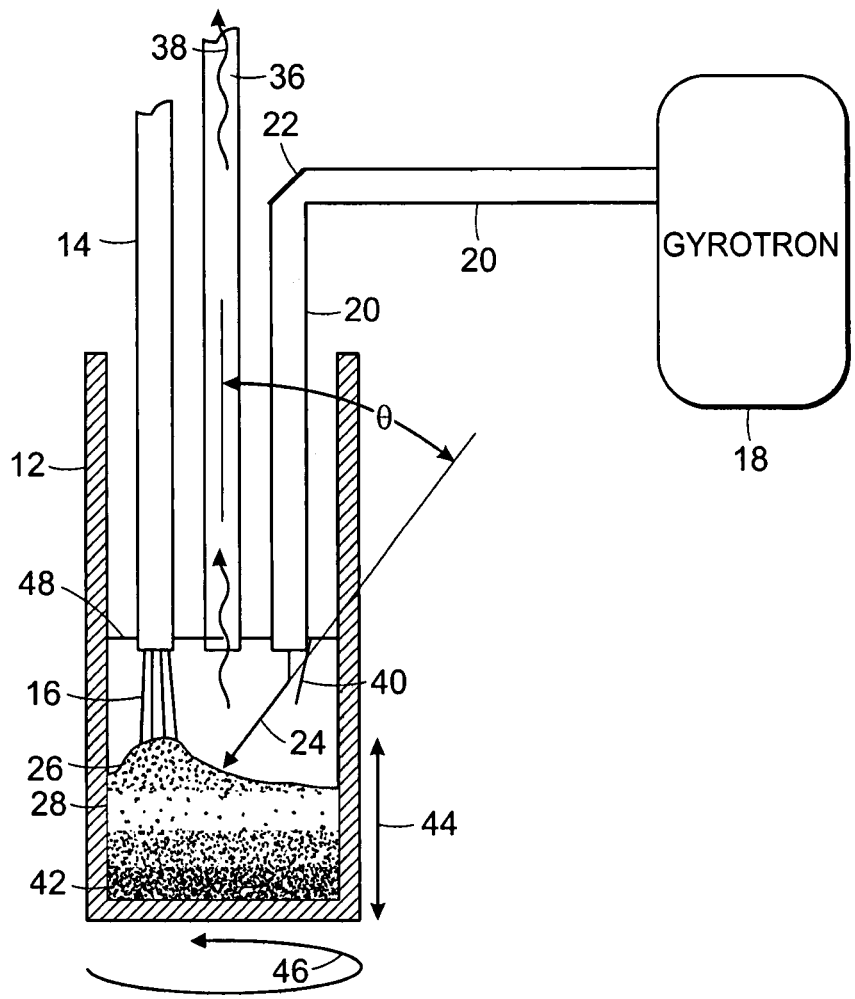
FIGS. 2a and 2b are cross-sectional views of another embodiment of the invention.

An embodiment of the invention that demonstrates the unique capability for the directed energy melter to operate without a conventional melter vessel is shown in FIG. 2. In this embodiment, the glass is processed directly in the final storage container 12. Many of the features in FIG. 2 are in common with the embodiment described above in conjunction with FIG. 1. There are a few key differences. In the embodiment in FIG. 2a the frit feed pipe 14 brings in the glass frit material 16. The waveguide 20 with the mirror bend 22 brings in the directed energy beam 24 from the gyrotron 18. In this embodiment, a beam launch mirror 40 is provided at the waveguide 20 aperture to achieve an angle of incidence Θ for improving beam absorption at the melt surface.

Figure 2B:
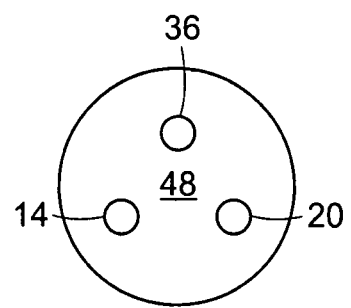

As shown in FIGS. 2a and 2b, a metallic cover plate 48 along with the walls of container 12 traps directed energy beam reflections from the melt surface for additional heating of the melt. It is noted that it may be possible to do without the beam launch mirror 40 and rely only on the cover plate 48 and container walls to trap reflections.

During the filling and melting process the container 12 is continuously rotated as shown by the arrow 46 and lowered as shown by the arrow 44 to fill the container 12 uniformly with processed glass while maintaining a fixed distance between the waveguide aperture and melt surface. The fixed distance is optimized for the process.

There are three states for the container fill: a premelt frit accumulation 26 produced when the premelt is rotated into the directed energy beam 24, and a cooling, hardening glass 42 as the container 12 is lowered from the energy deposition layer. The frit feed rate, energy beam power, and container 12 rotation rate are adjusted to maintain a cold cap to trap volatiles. The exhaust duct 36 provides an exit for the exhaust 38 not trapped by the cold cap. An additional containment room (not shown) surrounding the structure in FIG. 2 would be needed to trap exhaust and energy leakage between the edges of the cover plate 48 and container 12 walls.

Figure 3:
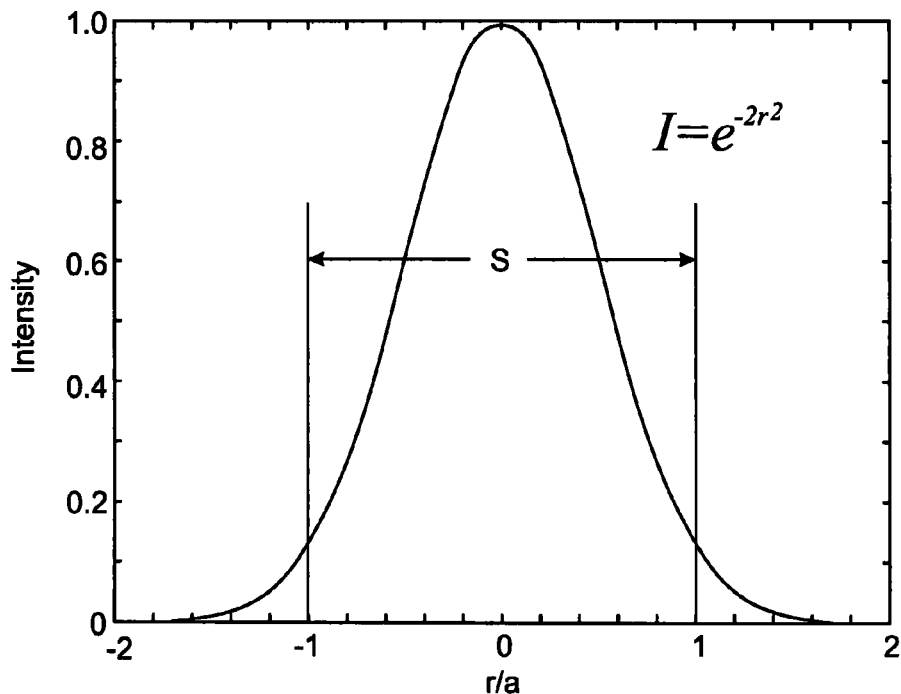
FIG. 3 is a graph illustrating a diffraction limited electromagnetic directed energy beam.
Figure 4:
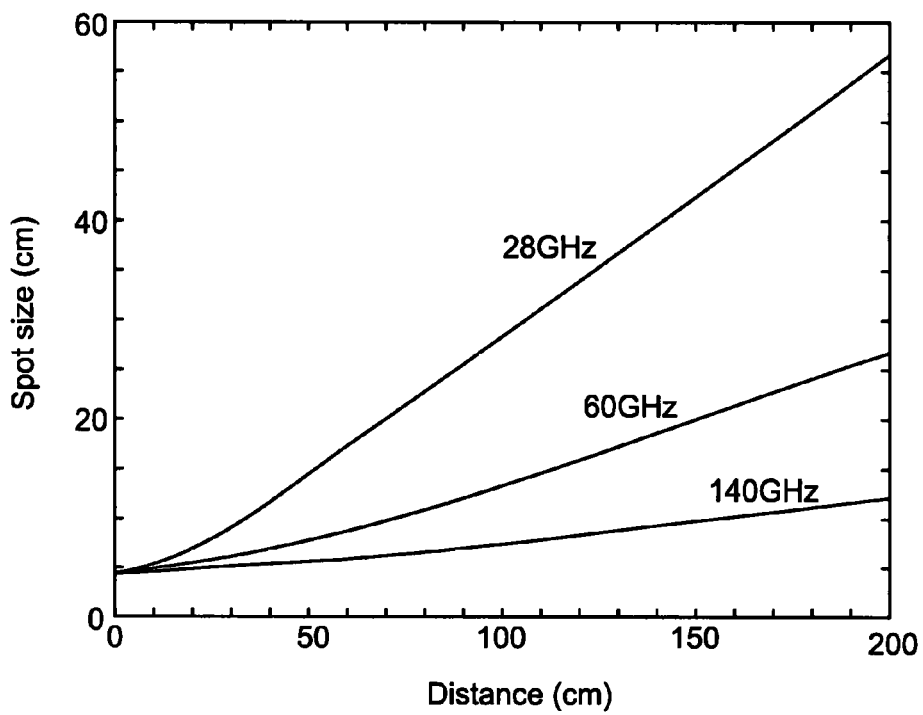
FIG. 4 is a graph of spot size versus distance of a directed energy beam.

The directed energy beam size and consequently the heated spot size are determined by the waveguide 20 diameter, the wavelength of the electromagnetic beam, and the distance of the heated spot from the waveguide aperture. For the most efficient waveguide propagating mode ($HE_{11}$) the launched energy beam has a Gaussian profile as shown in FIG. 3. The diameter of the beam, s, is defined as the diameter to where the beam intensity falls to 13.6% of the peak intensity. Within this diameter is contained 86.5% of the total power. At the waveguide launch aperture the beam diameter is 0.64 times the inner diameter, D, of the waveguide 20. The well known rules of diffraction cause this diameter to increase with distance from the waveguide as, $$s = 0.64 D \sqrt{\left(\frac{\lambda z}{0.325 D^2}\right)^2 + 1}$$

where λ is the directed energy beam wavelength and z is the distance from the waveguide aperture. FIG. 4 shows the beam diameter as a function of distance from a 7.5 cm (3 in.) diameter waveguide aperture for three millimeter wave frequencies. The diffraction increase in beam size is less with higher frequencies (shorter wavelength).

A rough model for determining the steady state heating process in the melter would be to consider the millimeter wave heating of the premelt waste material being added at a constant rate to the top of a molten glass bath. In this case for much of the heating process the absorption length of the millimeter wave radiation would be that which is characteristic of a non-conducting material. It might then be considerably greater than 1 cm. If adiabatic heating is assumed, Processing Rate[moles/volume/sec]=(Intensity of Absorbed Millimeter Waves)/(Heat Capacity× Absorption Length×Temperature Change)

Material Processed[moles/sec]=Surface Area×Absorption Length×Processing Rate

Using silicon dioxide glass as an example glass material, the above equations can be used to estimate how much glass could be processed for a given directed energy beam power. The heat capacity of silicon dioxide is about 70 joules/mole/K over the range of 300-1500 K. Assuming a directed energy beam diameter of about 10 cm (4 in.) and 100 kW beam power (1.3 kW/cm$^2$) a material processing rate of about 230 kg/hr (506 lbs/hr) to a temperature of 1600° C. could be achieved. It is noted that higher beam power and appropriate scaling will be needed for a larger system.

Another parameter to be considered is the speed with which the glass material is heated to its processing temperature. It is important that the glass not be volatilized by too long an exposure at the heating intensities being proposed here. If thermal conduction losses away from the heated spot are assumed negligible:

Heat Time[sec]=(Heat Capacity×Absorption Length× Density×Temperature Change)/(Intensity of Absorbed Millimeter-Wave)

In the case of silicon dioxide (0.037 mole/cm$^3$ density) if the absorption depth is 1 cm, then it would take only 2.6 seconds exposure at 1.3 kW/cm$^2$ to heat the glass from room temperature to 1600° C. This time would be longer if the absorption depth is deeper and less for shorter depth. It is important that fresh fill material be added and/or the storage container be rotated fast enough to prevent volatilization. The directed beam energy power, beam diameter, and frit feed rate would be designed to achieve the desired processing rates without volatilization. Some caveats are:

The amount of the material processed is independent of the absorption length, but absorption length will determine maximum exposure intensity limits to prevent volatization.

The temperature dependence of the absorption depth in the melt material is ignored in the above examples. At low temperature the material is like a dielectric with bulk absorption, but as the temperature increases it gradually transitions to a more absorptive/conductive state until it is molten. At that point the absorption is primarily at the surface.

It may be useful to control the millimeter wave radiation so that it is employed in a two-step process where initially the waste plus frit that is added to the melter is melted without undesirable volatilization. This step would then be followed by heating, which provides an appropriate increase in the surface temperature so as to obtain the desired glass temperature. A relatively thin layer of waste material plus frit could be added prior to the second step so as to provide a cold cap and prevent volatilization during the heating of the top layer of the glass.

Experience with batch melts in crucibles in the electric furnace at the Massachusetts Institute of Technology in Cambridge, Mass. shows that the millimeter wave (137 GHz) reflectivity of an initial glass frit fill begins to be detectable at about 800-900° C. when the rit begins to form a glassy surface. It is likely that above that temperature the millimeter wave absorption depth in the glass material is decreasing significantly.

The directed energy melter disclosed herein provides a number of advantages over conventional glass melter technology. The present invention results in substantially lower waste processing cost due to higher waste loading per kilogram of glass processed. The higher waste loading results from the higher temperature operation provided by the melter of the invention. The higher waste loading per kilogram of glass can translate into billions of dollars in savings for radioactive waste disposal costs in the United States. Lower waste processing costs is also made possible by the higher throughput (kg/hr) resulting from higher intensity heating. The higher waste loading also results in a smaller waste volume that substantially lowers glass product storage costs.

The present invention provides a much wider range of melter geometries since melter geometry is no longer limited by Joule heating electrode configuration. The need for a crucible as used in current melters may be eliminated when the glass is processed in its final storage configuration as discussed above in conjunction with FIG. 2. Glass barriers can be provided around spent fuel rods in above ground storage facilities. The present invention provides a unique way to provide glass barriers with a wide range of geometric configurations.

Selected uniform heating below a cold cap on top of the melt can be used to contain volatile emissions while delivering the maximum heating at the cold cap/melt surface interface. The cold cap/melt surface interface is currently a major thermal barrier in Joule heated melters and greatly limits processing speed. The directed energy melter of the invention will not have such a limitation.

Remote guiding of the beam energy by waveguides allows placement of the gyrotron outside of the hot cell thereby eliminating points of failure inside of the radioactive processing cell or canyon for the power delivery system of the melter of the invention. The melter technology disclosed herein will have a longer refractory life due to elimination of sidewall heating at electrodes in a traditional Joule heated melter.

The present design imposes no lower limits on melter size thereby making possible melter sizes and geometries that are suitable for use with nuclear materials with high criticality. The glass in the melter can be very shallow thereby again providing for criticality safety.

The present invention allows for a higher degree of control of glass temperature by controlling the directed beam energy. The range of heating intensity (e.g., a factor of between 3 and 10) is substantially greater than that which is available from other heating sources. The large high-end value of heating intensity (e.g., 100 kW/cm$^2$) and wide range can be used to provide a substantially greater amount of waste processing capability and control than has previously been possible. This enhanced capability and control can be used to minimize waste preprocessing requirements, extend the options for the type of glass that is formed and to minimize the size of the melter. The present invention also provides for selected heating at reduced rates in the premelt cold cap material with partially absorbed millimeter wave beam energy.

The millimeter wave radiation can also be used to volumetrically preheat the waste as it falls into the melt. This preheating can significantly improve throughput capability. For low water content, the millimeter wave radiation would interact with the waste as if it is a non-conducting material (in contrast to the situation when it is in the melt phase) thus enabling volumetric heating. It should be recognized that one can use multiple beams for greater control of preheat, melt zone localization and cold cap cover for volatiles entrapment. The intensity of the millimeter wave radiation can be controlled in a feedback mode using the information from various sensors (e.g., temperature, glass characteristics). The melter of the invention can fit within the space envelope designed to contain current Joule-heated melter technology. Therefore, no major design modifications will have to be made to field this advanced melting technology disclosed herein.

It is recognized that modifications and variations of the invention disclosed herein will be apparent to those of ordinary skill in the art and it is intended that all such modifications and variations be included within the scope of the appended claims.

What is claimed is:

1. A directed energy melter for vitrification of waste material comprising:
   a vessel;
   structure for introducing waste material into the vessel; and
   waveguide structure configured to introduce directed energy in the form of millimeter wave electromagnetic radiation into the vessel to heat the waste material,
   wherein the melter is configured such that the directed energy and the waste material rotate and translate relative to each other during heating of the waste material.

2. The melter of claim 1 wherein the millimeter wave electromagnetic radiation is in the frequency range of 28 GHz-280 GHz.

3. The melter of claim 1 wherein the waveguide is corrugated.

4. The melter of claim 1 further including a gyrotron to generate the millimeter wave electromagnetic radiation, the gyrotron configured to introduce the electromagnetic radiation into the waveguide structure.

5. The melter of claim 1 wherein the angle of incidence of the radiation on the material is in the range of 0 and 70°.

6. The melter of claim 1 wherein the structure for introducing waste material also introduces glass frit into the vessel.

7. The melter of claim 1 further including Joule heating structure.

8. The melter of claim 1 further including inductive heating structure.

9. The melter of claim 1 further including microwave heating structure configured to operate at a frequency less than 10 GHz.

10. The melter of claim 1 wherein the melter is operable in a batch or continuous mode.

11. The melter of claim 1 further including a drain system to convey molten material into containers.

12. The melter of claim 1, wherein the vessel is configured as the final storage container for the waste material.

13. The melter of claim 1 wherein the device is configured to impinge on the waste material a radiation having an intensity in the range of 0.1 and 10 Kw/cm2.

14. The melter of claim 13 further including feedback means for controlling the intensity of the radiation based on measurements of selected process parameters.

15. The melter of claim 14 wherein one of the selected parameters is temperature.

16. A directed energy melter or vitrification of waste material comprising:
   a vessel;
   structure for introducing waste material into the vessel; and
   waveguide structure for introducing millimeter wave electromagnetic radiation into the vessel to heat the waste material,
   wherein the vessel rotates and translates.

* * * * *